(12) United States Patent
Shervington et al.

(10) Patent No.: US 7,627,941 B2
(45) Date of Patent: Dec. 8, 2009

(54) FIXTURE FOR ALIGNING MOTOR ASSEMBLY

(75) Inventors: Roger M. Shervington, Rockford, IL (US); Vallabh V. Vaghani, Belvidere, IL (US); Laurence D. Vanek, Janesville, WI (US); Scott A. Christensen, Byron, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 520 days.

(21) Appl. No.: 11/259,729

(22) Filed: Oct. 26, 2005

(65) Prior Publication Data

US 2007/0090719 A1    Apr. 26, 2007

(51) Int. Cl.
*H02K 15/00* (2006.01)
(52) U.S. Cl. ............................. 29/596; 29/732; 29/271
(58) Field of Classification Search .................. 29/729, 29/732–737, 596–598, 609, 205 R, 33 R; 310/42, 49 R, 217–218, 259
See application file for complete search history.

(56) References Cited

U.S. PATENT DOCUMENTS

| | | | | |
|---|---|---|---|---|
| 3,716,912 A | * | 2/1973 | Vind | ............................. 29/596 |
| 3,798,757 A | * | 3/1974 | Hennessey et al. | ............. 29/596 |
| 4,016,470 A | * | 4/1977 | Gabor et al. | ................ 318/606 |
| 4,019,249 A | * | 4/1977 | Irvin | ............................. 29/596 |
| 4,031,610 A | * | 6/1977 | Singh et al. | .................... 29/598 |
| 4,476,395 A | | 10/1984 | Cronin | |
| 5,668,455 A | * | 9/1997 | Gotz et al. | .................. 318/602 |
| 5,786,645 A | | 7/1998 | Obidniak | |
| 6,011,377 A | | 1/2000 | Heglund et al. | |
| 6,359,414 B1 | | 3/2002 | Nickel | |
| 6,411,060 B1 | | 6/2002 | Jung | |
| 6,472,842 B1 | | 10/2002 | Ehsani | |
| 6,483,212 B1 | | 11/2002 | Mimura et al. | |
| 6,616,429 B1 | * | 9/2003 | Weber et al. | ................ 418/55.1 |
| 6,725,821 B2 | | 4/2004 | Warren et al. | |
| 6,777,851 B2 | | 8/2004 | Maslov | |
| 6,821,223 B2 | | 11/2004 | Henry | |
| 6,847,194 B2 | | 1/2005 | Sarlioglu et al. | |
| 6,940,251 B1 | | 9/2005 | Sarlioglu et al. | |

* cited by examiner

*Primary Examiner*—Minh Trinh
(74) *Attorney, Agent, or Firm*—Carlson, Gaskey & Olds, PC

(57) ABSTRACT

An alignment fixture includes a rotor fixture, a stator fixture and a sensor system which measures a rotational displacement therebetween. The fixture precisely measures rotation of a generator stator assembly away from a NULL position referenced by a unique reference spline on the rotor shaft. By providing an adjustable location of the stator assembly within the housing, the magnetic axes within each generator shall be aligned to a predetermined and controlled tolerance between the generator interface mounting pin and the reference spline on the rotor shaft. Once magnetically aligned, each generator is essentially a line replaceable unit which may be readily mounted to any input of a multi-generator gearbox assembly with the assurance that the magnetic alignment will be within a predetermined tolerance.

8 Claims, 6 Drawing Sheets

FIXTURE FOR ALIGNING MOTOR ASSEMBLY

BACKGROUND OF THE INVENTION

This invention was made with government support under Contract No.: F19628-03-0014. The government therefore has certain rights in this invention.

The present invention relates to a generator system, and more particularly to an alignment fixture therefor.

Vehicles, such as aircraft, utilize an electric generator system to provide electric power. The generators convert mechanical energy from rotation of the engine into electrical energy for the vehicle.

Oftentimes, vehicles such as aircraft require more power than a single generator can provide and utilize a multiple of generators on a multi-headed gearbox all driven by a common drivetrain. To allow for optimum parallel operation, each generator that feeds a common electrical bus is required to be synchronized with every other generator to which it is hard connected through the geartrain so that the voltage of each generator is in phase.

The mechanical alignment of the each coupled rotor to the common drive train defines the angular position of the rotor magnetic axis in its respective generator and thus the phasing of its alternating voltage. The voltage of two or more generators must be in phase with each other within a predetermined angular separation to permit connecting them in parallel. Assuming all the generators to be paralleled are identical and the magnetic axes aligned with each other, conventional mechanical alignment requires the housing assembly of each generator to be individually rotationally adjusted or "timed" relative the gearbox assembly to accommodate the magnetic variance and align the output phasing of each generator to each other generator. Although effective, such individualistic mounting may be relatively time consuming from a maintenance perspective. Adjustment to a multiple of generators is also often required whenever a single generator requires replacement which may still further increase maintenance down time.

Accordingly, it is desirable to provide an electric generator assembly system that accommodates electrical and mechanical variance and produces multiple generators all demonstrating similar angular relationship between individual output phasing and mounting interface position which results in apparently identical generators that minimizes individualized mounting alignment and maintenance concerns.

SUMMARY OF THE INVENTION

An alignment fixture according to the present invention includes a rotor fixture, a stator fixture and a sensor system which measures a rotational displacement therebetween. The fixture precisely measures rotation of a generator stator assembly away from a NULL position referenced to a unique reference spline on the rotor shaft.

In operation, a main stator assembly and the associated rotor shaft is assembled into the fixture. Power sources are connected and a relatively low voltage with minimal current is applied such that the magnetic axes of the assemblies align and cause the main stator assembly to rotate slightly. The rotational displacement is measured by the sensor system and the measured amount of rotational displacement is utilized to select a mounting pin assembly to install the stator assembly into the generator housing. By providing an adjustable mounting location for the stator assembly within the housing, the magnetic axes within each generator shall be aligned to a predetermined and controlled tolerance (such as within 2 degrees) between the generator interface mounting pin on the gearbox assembly and the reference spline on the rotor shaft.

Once magnetically aligned, each generator is essentially a line replaceable unit which may be readily mounted to any input of a multi-generator gearbox assembly with assurance that the magnetic alignment will be within a predetermined tolerance.

The present invention therefore provides an electric generator assembly system that accommodates electrical and mechanical variance and produces multiple generators all demonstrating similar angular relationship between individual output phasing and mounting interface position which results in apparently identical generators that minimizes individualized mounting alignment and maintenance concerns.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
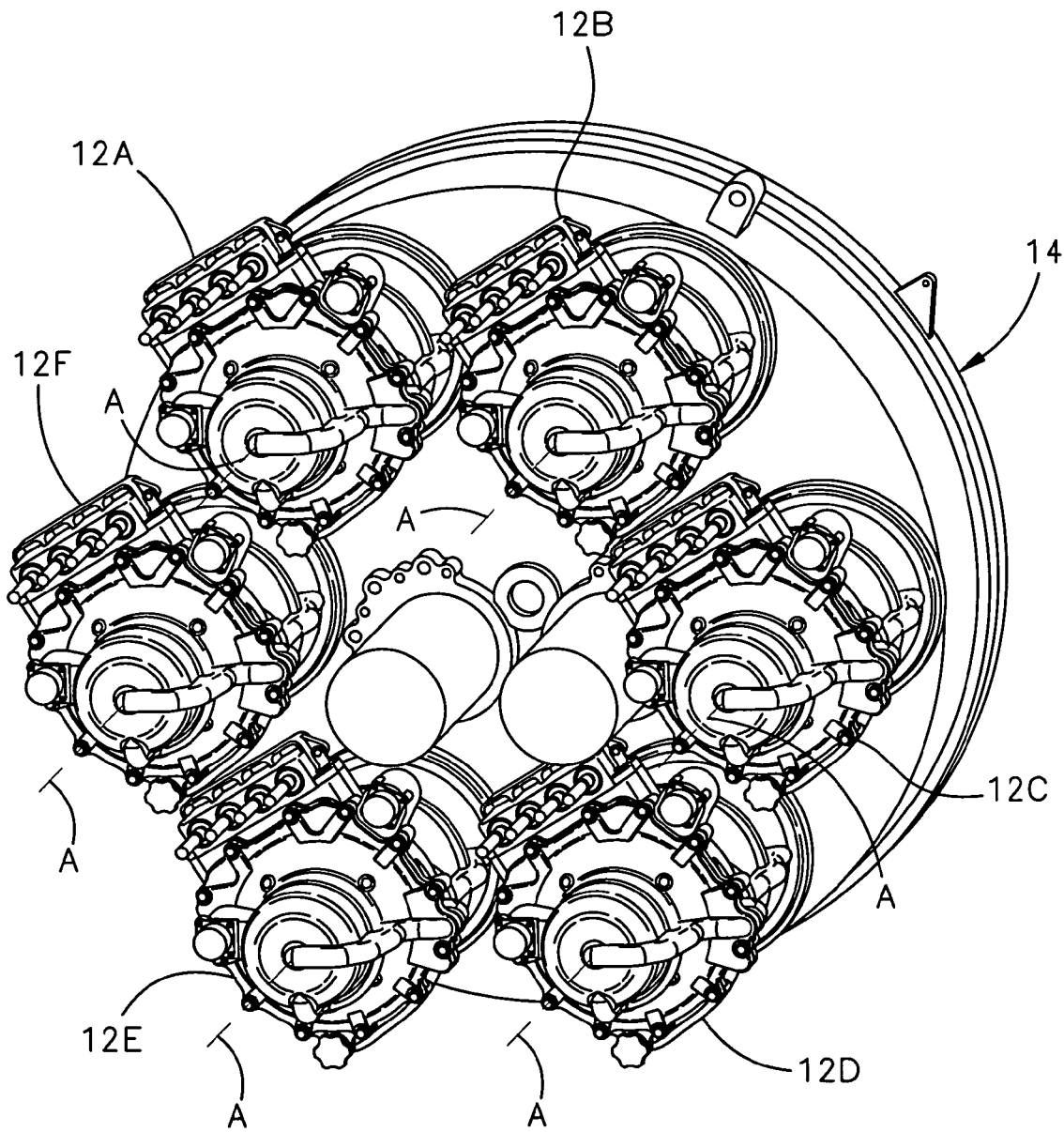
FIG. 1 is a general perspective view of an exemplary generator system use with the present invention.

FIG. 1 illustrates a general perspective view of an electric generator system 10 including a multiple of mechanically aligned generators 12A-12F such as wound field synchronous generators such as those utilized in an aircraft starter generator system. The generators 12A-12F are coupled to a gearbox assembly 14 which is coupled to an engine E, such as a gas turbine engine. The engine E drives the gearbox assembly 14 and the generators 12A-12F such that the generators 12A-12F individually produce electrical power.

Figure 2:
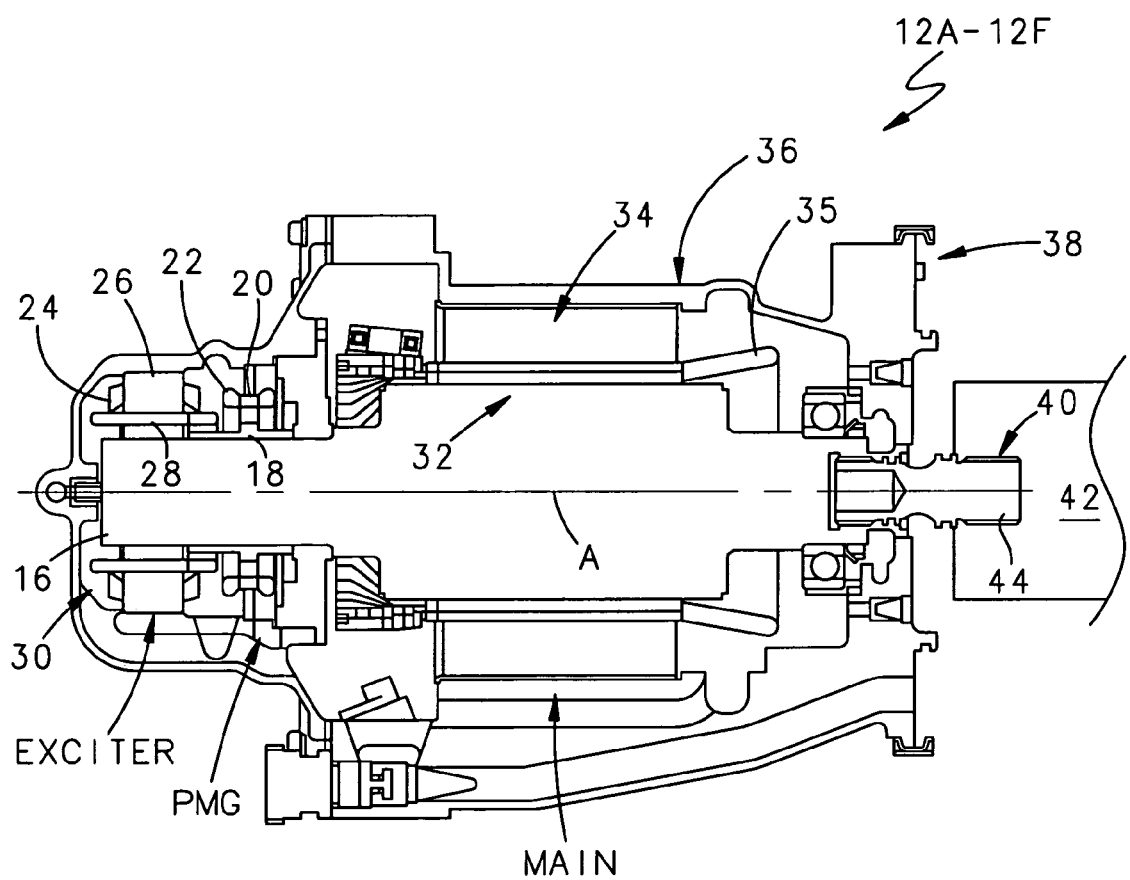
FIG. 2 is a sectional view of a single generator.

Referring to FIG. 2, each generator 12A-12F includes an elongated rotor shaft 16 which supports a series of permanent magnets 18. A stator 20 provided with windings 22 surrounds the magnets 18 and defines a permanent magnet generator (PMG) therewith. Electrical current generated in the winding 22 during rotation of the shaft 16 is provided via suitable conductors and an electronic controller not shown, to windings 24 in an exciter stator 26. Axially aligned with the exciter stator 26 and carried by the shaft 18 are windings 28 in which current is induced during rotation of the shaft 16.

The alternating current induced in the windings 28 is fed to a rectifier assembly 30 where it is rectified to direct current;

usually from three phase alternating current. Direct current from the rectifier assembly 30 is then fed to a main field winding 32 located in alignment with a main generator stator assembly 34. The main stator assembly 34 includes windings 35 in which an alternating current is induced and which, by suitable conductors not shown, may be connected to suitable loads.

The main stator assembly 34 is mounted within a housing assembly 36. The housing assembly 36 preferably includes an anti-rotation interface mounting pin system 38 which rotationally positions each GENERATOR 12A-12F in a predefined location when mounted to the gearbox assembly 14 (FIG. 1). The rotor shaft 16 includes an input spline 40 for engagement with a gear train 42 within the gearbox assembly 14. Preferably, the input spline 40 includes a shaft alignment feature 44 such as a missing tooth to align each generator 12A-12F with the gearbox assembly 14 and relative to each other.

Each generator 12A-12F is mounted to the gearbox assembly 14 such that each generator 12A-12F is affixed at a predefined rotational position relative the gearbox assembly 14 through the interface mounting pin system 38 and each generator 12A-12F are rotationally aligned to each other and relative to the gear train 42 through the shaft alignment feature 44 such that all generators may, for example, be aligned to the 12 O'clock position. That is, each housing assembly 36 of each generator is aligned to the gearbox assembly 14 by the interface mounting pin system 38 and all are in rotational alignment for common rotation by the interaction between the shaft alignment feature 44 and a corresponding feature in the gear train 42. This results in the electromotive forces in all the generators being approximately in phase with each other. Preferably, the electromotive forces are within a few degrees of each other by magnetically aligning the rotor shaft 16 with the main stator assembly 34 such that any generator 12A-12F so aligned in accordance with the present invention may be mounted to the gearbox assembly 14 and be assured to be within a predetermined magnetic alignment tolerance.

Figure 3:
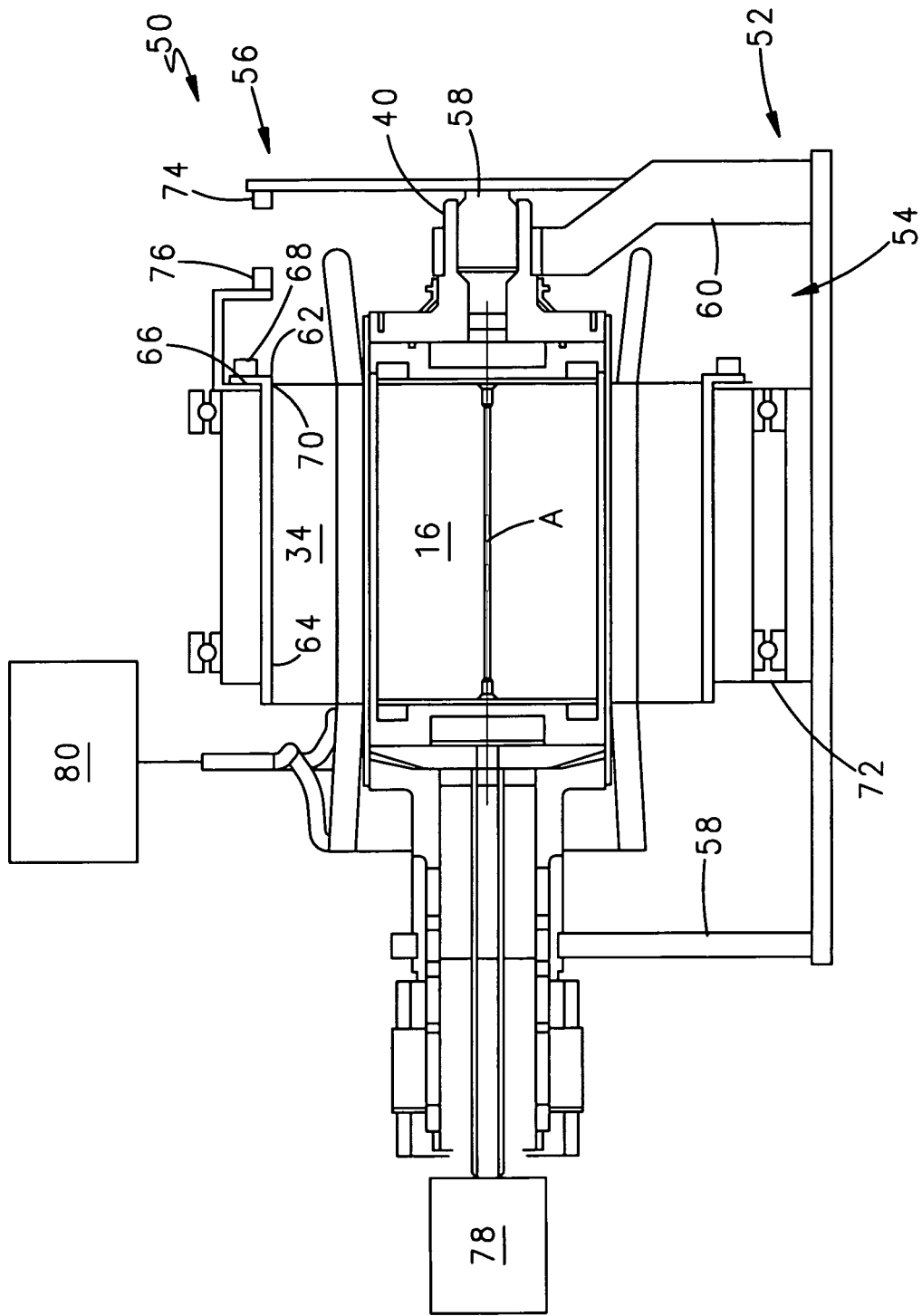
FIG. 3 is a perspective view of a generator alignment system according to the present invention.

To magnetically align the rotor shaft 16 with the main stator assembly 34, the main stator assembly 34 is clocked to a position within the housing assembly 36 in response to the magnetic properties of the rotor shaft 16 and main stator assembly 34 with an alignment fixture 50 (FIG. 3). Once magnetically aligned, each generator is essentially a line replaceable unit which may be readily mounted to the gearbox assembly 14 with the assurance that the magnetic alignment will be within a predetermined tolerance.

Referring to FIG. 3, the alignment fixture 50 generally includes a rotor fixture 52, a stator fixture 54 and a sensor system 56 which measures a rotational displacement of a stator mounted in stator fixture 54. The fixture 50 is capable of precisely measuring rotation of the stator assembly away from a NULL position as indicated from the unique spline on the spline shaft.

The rotor fixture 52 includes a missing tooth spline plug 58 which receives the input spline 40 to rotationally locate the rotor shaft 16 at a NULL or reference position. The missing tooth spline plug 58 simulates the geartrain 42 of the gearbox assembly 14 which receives the rotor shaft 16. The rotor fixture 52 maintains the rotor shaft 16 in a rotationally fixed position about axis A.

The solid tooth is manufactured to a consistent position on the rotor shaft 16 such as at a position indexed to a particular rotor core feature on each shaft. The rotor fixture 52 includes a first mount 58 and a second mount 60 which preferably locate on bearing land surfaces of the rotor shaft 16 to simulate a mounted position and minimize axial movement. It should be understood that various mounts may alternatively or additionally be utilized.

The stator fixture 54 includes a stator sleeve 62 which locates over the main stator assembly 34. Preferably, a seal 64 such as a multiple of O-rings firmly retain the main stator assembly 34 therein, however other locators may alternatively or additionally be provided. Preferably, the stator sleeve 62 includes a locator feature 66 such as an axial alignment aperture which receives a threaded fastener 68 or the like which engages a set of mounting apertures 70 on the stator assembly 34 to axially affix and rotationally locate the main stator assembly 34 relative to the stator sleeve 62.

A bearing assembly 72 is mounted about the stator sleeve 62 and relative the rotor fixture 52 to permit relative rotation therebetween about axis A. The bearing assembly 72 cradles the stator assembly 34 such that the stator assembly 34 is free to rotate about axis A.

The sensor system 56 is preferably an optical sensor arrangement mounted across the rotor fixture 52 and the stator fixture 54. The sensor system 56 includes a transmitter 74 and a receiver 76 such that one is mounted to the rotor fixture 52 and the other is mounted to the stator fixture 54. Preferably, one of the transmitter 74 or stator 76 is mounted directly to the missing tooth spline plug 58 to assure a rotationally reference directly associated with the NULL position.

Figure 4A:
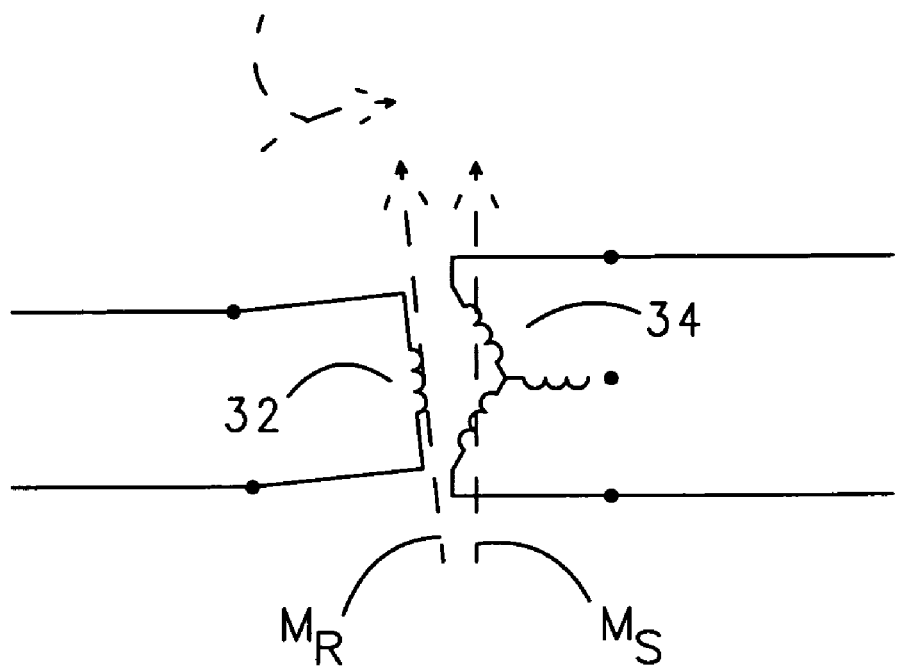
FIG. 4A is a schematic view of a generator with the magnetic axes prior to application of the present invention.

A power source 78, 80 provides power such as DC power directly to the main field winding 32 on the rotor shaft 16 and the main stator assembly 34 respectively. Preferably, at least two of three stator leads of the main generator stator assembly 34 are energized. When energized, a magnetic field axis MR in the main field winding 32 and a magnetic field axis MS in the main stator assembly 34 are generated which are typically somewhat misaligned prior to energizing the power sources (FIG. 4A).

Figure 4B:
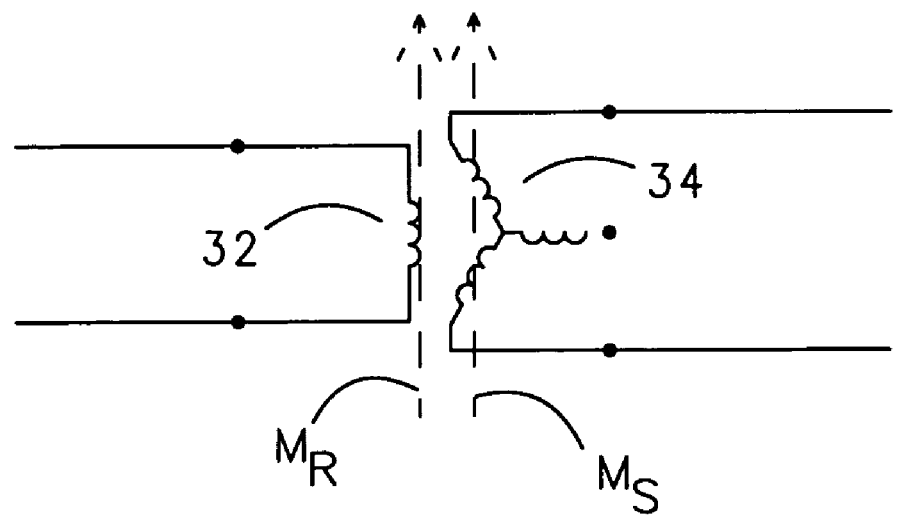
FIG. 4B is a schematic view of a generator with the magnetic axes aligned through the present invention.

In operation, the main stator assembly 34 and the associated rotor shaft 16 are assembled into the fixture 50. The power sources 78, 80 are connected to the main stator assembly 34 and the main field winding 32 of the rotor shaft 16. A relatively low voltage and minimal current is then applied such that the magnetic axes MR, MS will align (FIG. 4B) which will cause the main stator assembly 34 to rotate slightly relative the rotor shaft 16. The rotational displacement is then measured by the sensor system 56.

The measured amount of rotational displacement is utilized to select a mounting pin assembly 82 (FIG. 5) with corresponding measured locations from NULL to install the main stator assembly 34 into the generator housing assembly 36. By providing an adjustable rotational location for the main stator assembly 34 within the housing assembly 36, the magnetic axis of every generator shall be aligned to a predetermined and controlled tolerance (such as within 2 degrees) between the generator interface mounting pin system 38 and the shaft alignment feature 44 on the rotor shaft 16.

The relationship of the missing tooth spline and the main stator assembly 34 is through the magnetic alignment from the fixture 50. That is why the fixture 50 must locate and hold the rotor shaft 16 using the missing tooth spline of the shaft alignment feature 44. The fixture 50 further must reference the "NULL" position by locating the stator/sleeve assembly relative to the shaft alignment feature 44 the same for all parts ever aligned through use of the sensor system 55. The sensor system 56 aligns at the "NULL" position before the assemblies are energized. Once energized the main stator assembly 34 will rotate into magnetic alignment (FIG. 4B) alignment. The measurement of this rotation is how the rotor shaft 16 is then referenced to the main stator assembly 34 and how the appropriate mounting pin assembly 82 is determined.

Figure 5:
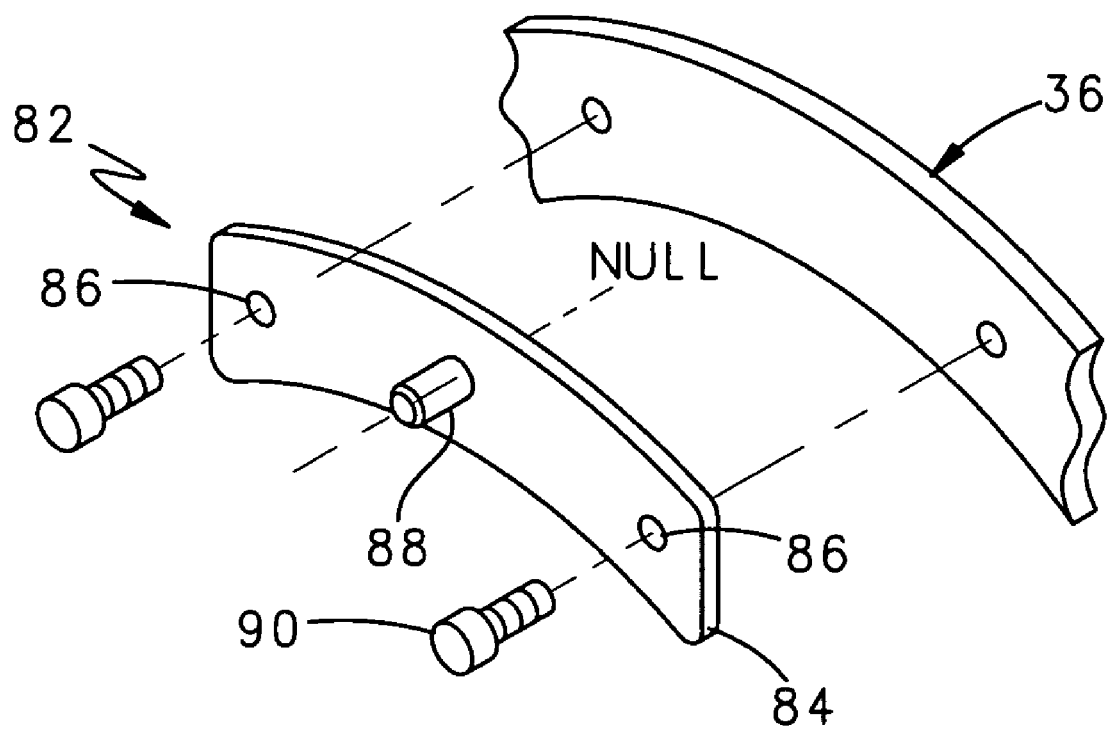
FIG. 5 is a perspective view of an alignment pin assembly.

Referring to FIG. 5, each mounting pin assembly 82 generally includes a plate 84, a pair of mounting apertures 86 and an alignment pin 88. The mounting pin assembly 82 rotationally locates the stator assembly 34 within the housing assembly 36 at rotational bias as determined by the alignment fixture 50. The pair of mounting apertures 86 receive threaded fasteners 90 to mount the mounting pin assembly 82 to a predefined location on the housing assembly 36. The mounting pin assembly 82 rotationally aligns the stator assembly 34 within the housing assembly 36. That is, the stator assembly 34 is rotationally biased within the housing assembly by the appropriately biased alignment pin 88 to compensate for the magnetic misalignment determined through the alignment fixture 50.

Figure 6A:
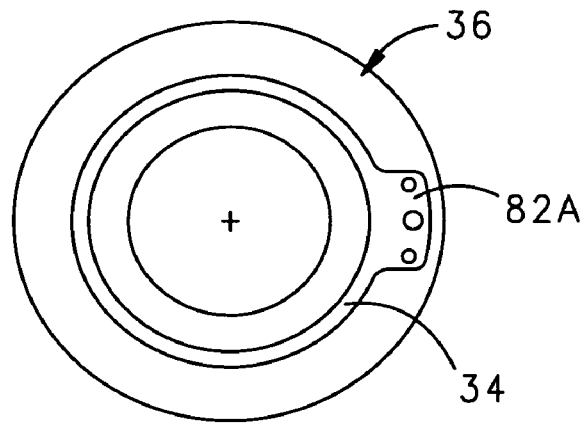
FIG. 6A is a perspective view of a generator main stator assembly aligned to a NULL position though an associated first alignment pin assembly.
Figure 6B:
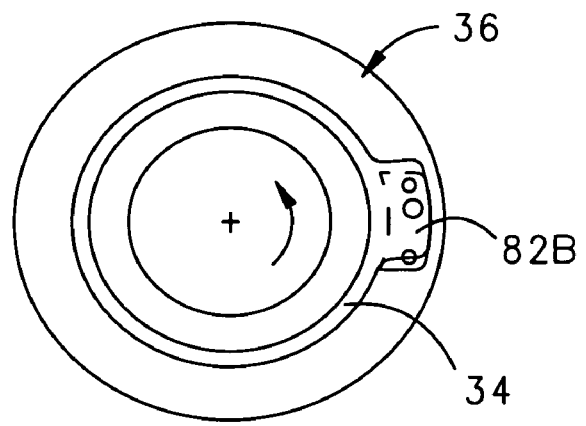
FIG. 6B is a perspective view of a generator main stator assembly aligned to a +5 degree position though an associated alignment pin assembly.
Figure 6C:
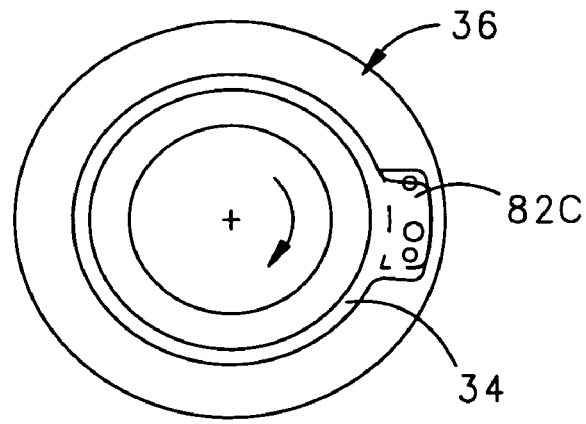
FIG. 6C is a perspective view of a generator main stator assembly aligned to a −5 degree position though an associated alignment pin assembly.

Referring to FIGS. 6A-6C, various mounting pin assemblies 82A-82C are illustrated. It should be understood that although only three pin assemblies are illustrated for discussion purposes, any number of pin assemblies having any increment therebetween may be utilized with the present invention. Applicant has preferred half degree increments of change [e.g., 20 pins between the +/−five degree (FIG. 6B, 6C) pin assemblies] to provide effective fidelity, however, any increment may alternatively be utilized.

Notably, each mounting pin assembly 82A-82C offsets the alignment pin 88 relative the mounting apertures 86 which results in a fixed rotational offset. The mounting pin assembly 82A illustrated in FIG. 6A is utilized for a stator assembly 34 that is in perfect magnetic alignment (FIG. 4B) with the rotor shaft 16 about axis A, e.g. the stator assembly 34 did not rotate in the alignment fixture 50. As such, the mounting pin assembly 82 which is selected is the NULL pin assembly which has the alignment pin 88 mechanically centered between the mounting apertures 86. Should, as is more likely, the magnetic field axes MR, MS (FIG. 4A) not be perfectly aligned, a mounting pin assembly 82 which compensates for the magnetic offset (to return to FIG. 4B when assembled) is selected and installed on the housing assembly 36 to rotationally clock the main stator assembly 34 within the housing assembly 36 in the installed position. While the housing assembly 36 must be closely toleranced from the mounting location of the adjustable pin assembly mount points 86 to the external interface mounting pin system 38 (FIG. 2) that interfaces with the gearbox assembly 14 (FIG. 1), no other adjustment is required once the stator 34 is assembled into the housing assembly 36 at the clocked rotation as determined by the alignment fixture 50. The generators 12A-12F thereby become essentially line replaceable. That is, any generator 12A-12F may be mounted at any position on the gearbox assembly 14.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An alignment fixture for magnetic alignment of a rotor and a stator comprising:
   a rotor fixture to mount a rotor in a fixed rotational position about an axis of rotation;
   a rotor shaft receipt member fixedly mounted to said rotor fixture to locate the rotor to a predetermined null position, said rotor shaft receipt member includes a spline arrangement to which said rotor shaft is rotationally indexed to said predetermined null position; and
   a stator fixture to mount a stator about said axis of rotation to permit a rotational displacement of the stator relative the rotor in response to an application of electrical power to the rotor and the stator.

2. The alignment fixture as recited in claim 1, wherein said predetermined null position is related to a missing tooth formed in said rotor shaft receipt member.

3. The alignment fixture as recited in claim 1, wherein said rotor fixture indexes on a bearing land of the rotor.

4. The alignment fixture as recited in claim 1, further comprising a bearing cradle which mounts said stator fixture for rotation about said axis of rotation.

5. The alignment fixture as recited in claim 4, wherein said stator fixture includes a sleeve which receives the stator therein, said sleeve mounted to said bearing cradle.

6. The alignment fixture as recited in claim 5, wherein said bearing cradle is mounted to said rotor fixture.

7. The alignment fixture as recited in claim 1, further comprising a sensor system operable to measure a rotational displacement of the stator relative the rotor.

8. The alignment fixture as recited in claim 7, wherein said sensor system includes an optical sensor affixed to one of said rotor fixture or said stator fixture to measure the rotational displacement.

* * * * *

UNITED STATES PATENT AND TRADEMARK OFFICE
CERTIFICATE OF CORRECTION

PATENT NO. : 7,627,941 B2  Page 1 of 1
APPLICATION NO. : 11/259729
DATED : December 8, 2009
INVENTOR(S) : Shervington et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this

Twenty-first Day of December, 2010

David J. Kappos
*Director of the United States Patent and Trademark Office*